No. 664,225. Patented Dec. 18, 1900.
E. F. MEYER.
MORTISING MACHINE.
(Application filed Oct. 8, 1900.)
(No Model.) 2 Sheets—Sheet 2.
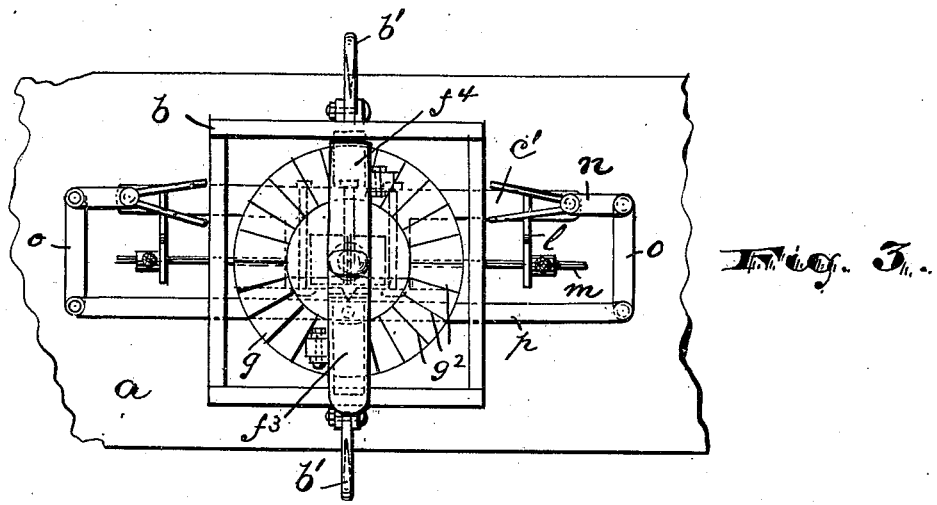
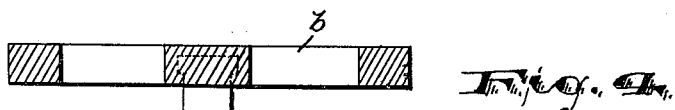
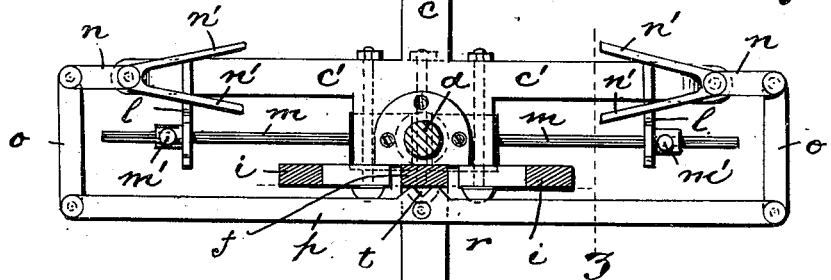
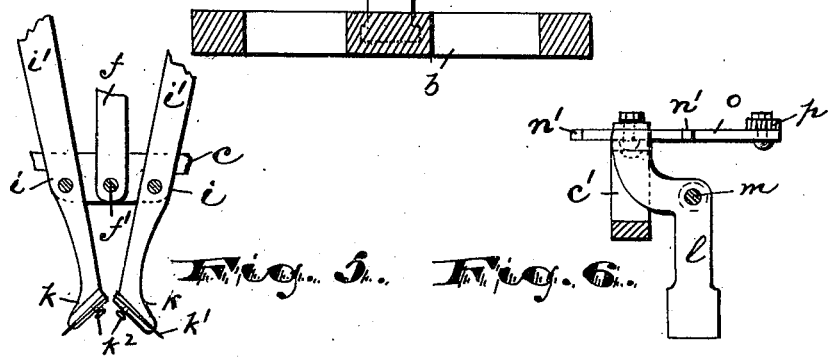
WITNESSES: INVENTOR:
Ernest F. Meyer,
BY
Draket Co.
ATTORNEYS

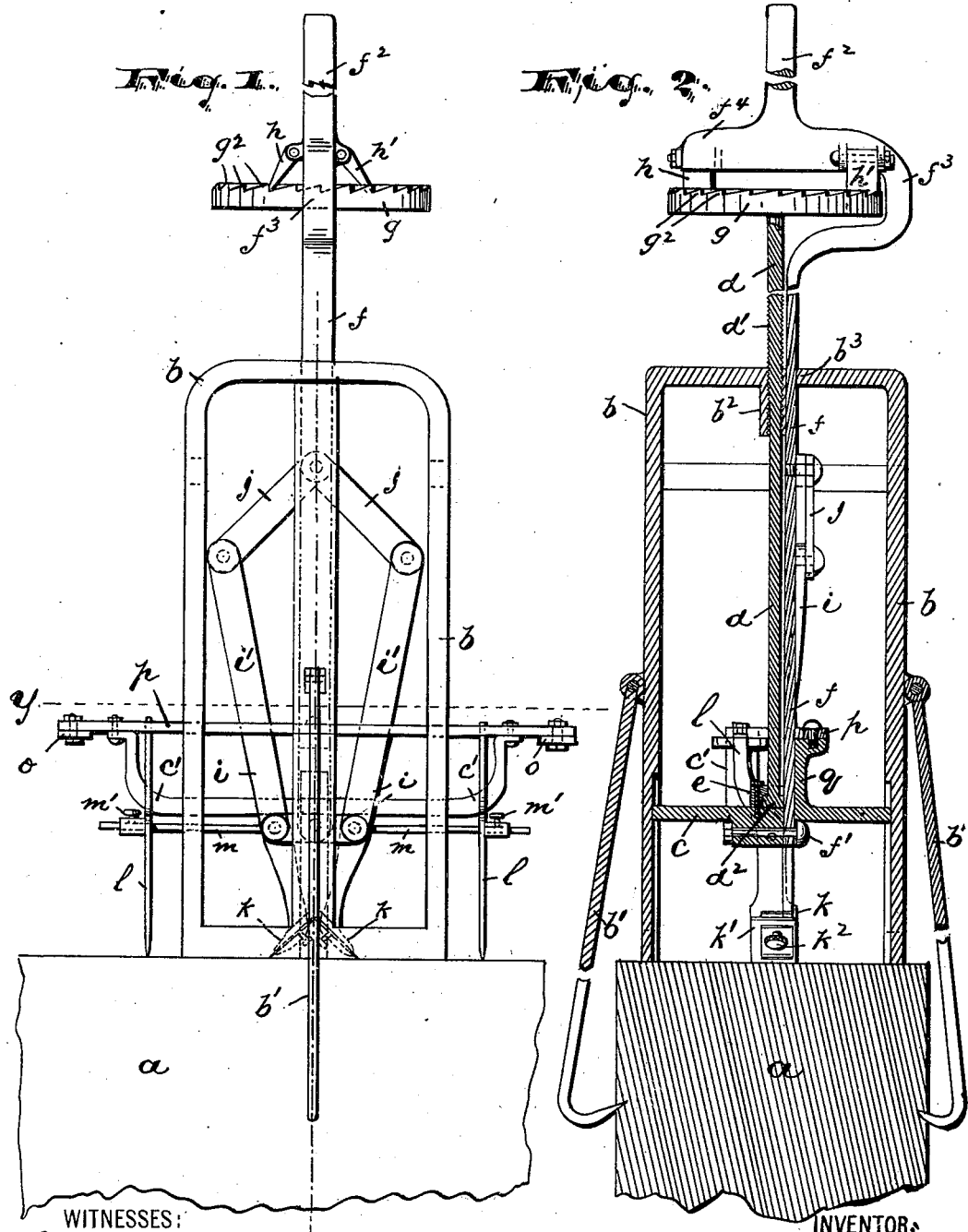

UNITED STATES PATENT OFFICE.

ERNST F. MEYER, OF WAVERLY PARK, NEW JERSEY.

MORTISING-MACHINE.

SPECIFICATION forming part of Letters Patent No. 664,225, dated December 18, 1900.

Application filed October 8, 1900. Serial No. 32,366. (No model.)

*To all whom it may concern:*

Be it known that I, ERNST F. MEYER, a citizen of the United States, residing at Waverly Park, in the county of Essex and State of New Jersey, have invented certain new and useful Improvements in Mortising-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide an improved machine for cutting mortises in timbers; to enable the ends of the mortise to be formed by a drawing knife cut and to secure greater smoothness and ease of working; to obtain such a machine which can be operated by one movement, the cutting-blades working in proper relative time and position; to obtain a machine which can be adjusted to cut different sizes of mortises; to obtain an automatic feed of the knives to their work, and to secure other advantages and results, some of which may be referred to hereinafter in connection with the description of the working parts.

The invention consists in the improved mortise-cutting machine and in the arrangements and combinations of parts of the same, all substantially as will be hereinafter set forth, and finally embraced in the clauses of the claim.

Referring to the accompanying drawings, in which like letters of reference indicate corresponding parts in each of the views, Figure 1 is a side elevation of my improved machine, and Fig. 2 is a sectional view of the same on line $x$, Fig. 1. Fig. 3 is a plan of the machine as it stands on a timber. Fig. 4 is a horizontal section on line $y$, Fig. 1. Fig. 5 is an enlarged detail of the longitudinal cutting-blades and their holding-arms; and Fig. 6 is a detail section on line $z$, Fig. 4, showing one of the cross-cutting knives.

In said drawings, $a$ indicates a timber to which my machine has been applied for the purpose of cutting a mortise, $b$ indicating the open-work frame of said machine adapted to stand upon the face of the timber around the mortise to be cut and held firmly to the said timber by hooks $b'$ of suitable construction, adapted to be struck into the sides of the timber. A horizontal plate $c$ slides vertically in the lower part of said frame $b$, and from said plate a centrally-disposed rod or shaft $d$ extends upward through a threaded bearing $b^2$ in the top of the frame, said rod being itself threaded for a distance, as at $d'$, to work in said bearing. At the lower end of the shaft $d$ is formed a disk-like head $d^2$, which is held to the plate $c$ by a cap $e$, fastened thereto, and thus the shaft can rotate independently of the plate and yet carry said plate with it as it moves longitudinally. Said plate $c$ serves as a fulcrumal support for the cutting-knives and the operating-lever $f$, which extends upward parallel to the shaft $d$ described and works at its upper end in a slot $b^3$ in the frame $b$. Said lever is pivoted at its lower extremity upon a pin or bolt $f'$, just beneath the plate $c$, and upon this pin the lever is adapted to oscillate in a vertical plane. The top of the lever has a suitable handle $f^2$, and below said handle is a lateral bend or loop $f^3$, which provides space for a wheel $g$, fast on the shaft $d$, to turn. Said wheel lies in horizontal position, and its upper surface has near the periphery pawl-teeth $g^2$. The upper arm of the loop or bend $f^3$ overlies this wheel, closely adjacent thereto, and said arm is extended, as at $f^4$, to reach diametrically across the wheel. Pawls $h\ h'$ are then pivoted to the overlying portion of the lever to engage the teeth $g^2$, said pawls being on opposite sides of the lever and oppositely directed over the annular row of pawl-teeth, so that as the lever is oscillated in one direction one pawl engages a tooth and pushes the wheel around while the other pawl is being drawn back to initial position for pushing. The wheel $g$, and thus the shaft $d$, is thereby continuously rotated to lower the plate $c$ and force the knives downward to their work.

The main cutting-knives, or those which work longitudinally to gouge out the bottom of the mortise, are two in number, oppositely arranged in holding-arms $i$, pivoted on opposite sides of the operating-lever $f$ in approximately the same vertical plane therewith. The fulcrums of said holding-levers are close to and in horizontal line with the fulcrum of the operating-lever, and the upper ends $i'$ of the holding-arms diverge upwardly away from said operating-lever in normal position of the parts, the extremities being linked by links $j$ to a higher point on the operating-lever. The lower ends of the holding-arms $i$ extend considerably below the plate $c$ and form at their extremities feet $k$, providing inclined sockets for knives $k'$, which knives are adapted to be held firmly in place by set-screws $k^2$, with their blades inclined oppositely downward. Thus as the operating-lever $f$ is oscillated one knife is always cutting while the other is being drawn back for a stroke. The knives thus described serve to cut shavings at the bottom of the mortise from its middle toward each end, and to transversely sever said shavings at the opposite ends of the mortise I have provided other knives $l\ l$, working at the ends of the mortise in planes perpendicular to the length of the mortise. These cutting-off knives $l$ are pivoted in upright position upon horizontal rods $m$, which permit of the knives being adjusted toward or away from each other, they being held at any desired point by set-screws $m'$. The upper ends of the knives form handles which lie each between the prongs $n'$ of the forked end of an arm $n$, said arms being pivoted in horizontal plane upon brackets $c'$ from the plate $c$ and with their forked ends toward one another, as shown in Fig. 4. The outer ends of the arms $n$ are pivotally connected by links $o$ to the opposite ends of a rocking bar $p$, extending longitudinally of the mortise adjacent to the operating-lever $f$ and at the opposite side thereof from that at which the forked arms lie. Said rocking bar is centrally pivoted upon an extension $q$ of the plate $c$ and at its edge next the operating-lever $f$ has a notch or recess $r$ to receive a projection or lug $t$ on the lever. Said lug $t$ fits with looseness in the recess $r$, and thus as the operating-lever is oscillated the rocking bar $p$ is rocked and in turn imparts its motion to the forked arms $n$, which actuate the cutting-off knives $l$. The blades of said knives are thus caused to cut back and forth across the ends of the mortise, effectually severing the shavings at their ends and preserving a smooth square end to the mortise. At the same time the opposite movements of the two sets of knives and the feeding of both to their work are accomplished by the single oscillatory motion of the lever $f$ and great simplicity attained.

Having thus described the invention, what I claim as new is—

1. A mortise-machine having a frame, a plate sliding in said frame, oppositely-facing knives pivoted on said plate and adapted to cut longitudinally of the mortise, other knives supported on the plate and adapted to work transversely of the mortise with a drawing cut, and means for operating said knives, substantially as set forth.

2. In a mortise-machine, an oscillating operating-lever, oscillating arms in the same plane with said lever and linked thereto, and knives carried by said arms, other knives swinging in planes at right angles to the plane of said first-mentioned knives, and a rocking bar and levers transmitting motion from said operating-lever to said last-mentioned knives, substantially as set forth.

3. A mortise-machine having a frame, oppositely-inclined knives adapted to act on the bottom of the mortise from its middle toward each end, vertical knives adapted to be drawn transversely across the mortise at its ends, and an oscillating lever for operating said knives, substantially as set forth.

4. A mortise-machine having a frame, knives working longitudinally of the mortise to cut out its bottom, an oscillating lever operating said knives, other knives working in vertical transverse planes at the ends of the mortise, and means for drawing said last-mentioned knives back and forth in an edgewise direction, said means being actuated by the said oscillating lever, substantially as set forth.

5. A mortise-machine having a body-frame, a plate sliding vertically in said frame, an operating-lever fulcrumed on said plate and adapted to be oscillated at its upper end, holding-arms also fulcrumed on said plate and linked to said operating-lever, inclined knives carried by said arms, rods projecting from opposite sides of the said plate parallel to the plane of the said holding-arms, knives fulcrumed on said rods and forming handles at their upper ends and means connecting the operating-lever and said handles, substantially as set forth.

6. In a mortise-machine, the combination of a frame, a plate sliding vertically in said frame, an oscillating operating-lever fulcrumed on said plate, arms at the sides of said lever and linked thereto, knives carried by said arms and adapted to cut longitudinally of the mortise, other knives fulcrumed in planes transverse of the mortise and adapted to swing in said planes to give the blade a drawing cut, and means for imparting motion from the operating-lever to said transverse knives, substantially as set forth.

7. In a mortise-machine, the combination with a vertically-sliding plate, an operating-lever fulcrumed thereon and longitudinally-cutting knives operated by said lever, of cutting-off knives pivoted to swing in transverse planes and having handle-like upper ends, pivoted arms having forked ends to inclose said handles, a rocking bar centrally pivoted opposite the operating-lever and having at its edge adjacent to said lever a connection therewith by a projection and corresponding recess, the ends of said rocking bar being linked to the forked arms, substantially as set forth.

8. In a mortise-machine, the combination with an oscillating operating-lever and longitudinally-cutting knives, of knives having blades adapted to travel back and forth across the end of the mortise with a drawing cut, and means connecting said end knives with the operating-lever, substantially as set forth.

9. In a mortise-machine, the combination with an oscillating operating-lever and longitudinally-cutting knives connected thereto, of transversely-cutting knives pivoted to swing in a plane at right angles to the first-mentioned knives, a rocking bar centrally pivoted opposite the operating-lever and being at its edge connected thereto, whereby oscillation of the lever will rock said bar, arms pivoted in a horizontal plane and having one end connected to the transverse cutting-knives, and the other end to said rocking bar, substantially as set forth.

10. In a mortise-machine, the combination of a frame, a vertically-sliding plate, knives carried by said plate, and an operating-lever, a shaft having bearings in said frame and on the plate and adapted to rotate independently of the plate but impart its longitudinal motion thereto, a wheel fast on the end of said shaft and having pawl-teeth, the said operating-lever being bent horizontally above said wheel, and pawls on said operating-lever adapted to alternately engage the toothed wheel as the lever is oscillated, substantially as set forth.

11. In a mortise-machine, the combination of longitudinally-cutting knives, knives adapted to be drawn transversely across the mortise, a frame, a plate sliding vertically in said frame and carrying said knives, a feed-shaft having bearings in the frame and on the sliding plate and adapted to be rotated to slide the plate, and an oscillating lever adapted to simultaneously operate both sets of knives and the feed-shaft, substantially as set forth.

In testimony that I claim the foregoing I have hereunto set my hand this 20th day of August, 1900.

ERNST F. MEYER.

Witnesses:
CHARLES H. PELL,
C. B. PITNEY.